T866006

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 2, 1969

866 O.G. 22

746,313

PROCESS FOR FORMING ALPHA-OLEFIN BLOCK COPOLYMERS

George O. Cash, Jr., P.O. Box 511, Kingsport, Tenn. 37662

Filed July 22, 1968. Published Sept. 2, 1969
Int. Cl. C08f *15/04, 1/42*
U.S. Cl. 260—878
No Drawing. 11 Pages Specification

Process of preparing alpha-olefin block copolymers comprising:

(a) initially reacting ethylene with an aluminum compound having the formula $AlR_3$ wherein R represents alkyl, aryl or cycloalkyl, to form a long chain aluminum hydrocarbon compound of the formula $$Al[(—C_2H_4)_y—C_2H_5]_3$$

wherein $y$ is an integer of at least about 19, and (b) subsequently contacting the product of said aluminum compound and ethylene with an alpha-olefin having the formula $CH_2{=}CHR$ wherein R is alkyl, alkenyl, aryl, cycloalkyl or cycloalkenyl, and a halide or acetyl acetonate of a transition metal of Groups IV–B to VI–B of the Periodic Table.

The resultant block copolymer has the structure $$A—(C_2H_4)_y—C_2H_5$$

wherein (A) is derived from the alpha-olefin added in step (b). Specific alpha-olefins contemplated are propylene, 4-methyl-1-pentene, 1-hexene, 1-octene, butadiene, isoprene, styrene and dimethylene cyclohexene.

Block copolymers with widely varying properties can be prepared. Relatively low molecular weight copolymers containing polymeric blocks of 3-methyl-1-butene or 4-methyl-1-pentene are useful as additives to lubricating oils to maintain a constant viscosity over a broad temperature range, for instance, while copolymers with polymeric blocks of propylene or 1-butene can be extruded to form tough, clear film or fibers with high tensile strength.